Aug. 20, 1968 B. OSTENDORF, JR 3,398,403
DATA PROCESSING CIRCUIT
Original Filed April 21, 1958
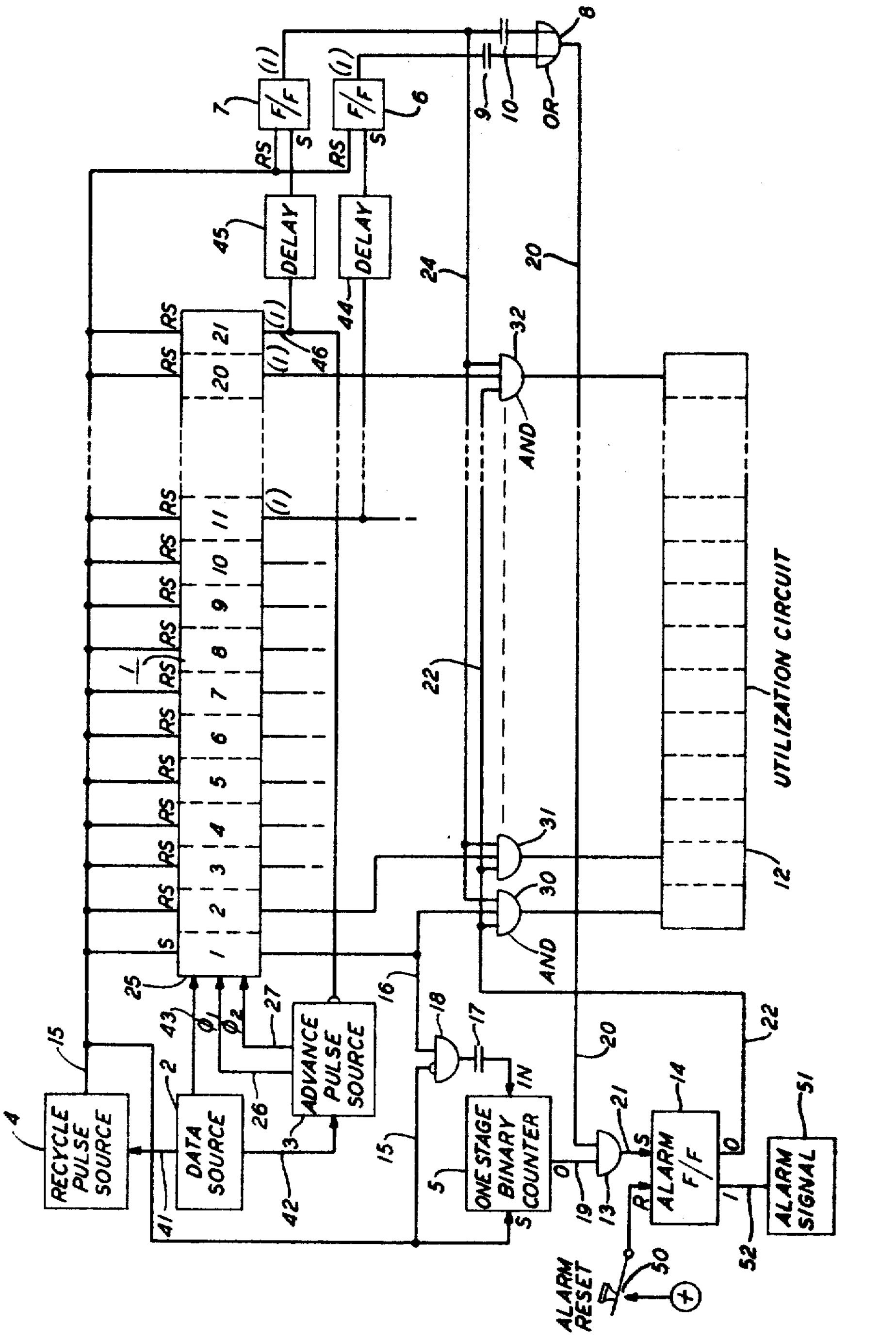
INVENTOR
B. OSTENDORF, JR.
BY Lucian C Canepa
ATTORNEY United States Patent Office 3,398,403

Patented Aug. 20, 1968

3,398,403

DATA PROCESSING CIRCUIT

Bernard Ostendorf, Jr., Stamford, Conn., assignor to Bell Telephone Laboratories, Incorporated, New York, N.Y., a corporation of New York Original application Apr. 21, 1958, Ser. No. 729,717. Divided and this application Jan. 15, 1962, Ser. No. 166,133

11 Claims. (Cl. 340—172.5)

This is a division of joint application Ser. No. 729,717, filed Apr. 21, 1958, now Patent 3,245,040, issued Apr. 5, 1966.

This invention relates in general to communication systems, and more particularly to control arrangements for such systems.

High speed digital communication and data systems are widely accepted because of their extremely favorable transmission and resolution characteristics and such systems are further enhanced through the use of time division multiplexing to achieve economies in transmission media. Such systems, however, are not without special problems, an example being the problem of accurate timing in the handling of digital data both in transmitting and receiving arrangements.

Heretofore, in such systems, the timing and counting functions have been divorced from the data circuits and this has resulted in a less than optimum use of circuitry and undue circuit complexity.

Accordingly, it is an object of this invention to reduce the complexity of digital data systems.

It is another object of this invention to combine functions in system elements to effect savings in equipment.

It is a further object of this invention to more efficiently perform timing and counting functions in such systems.

It is still another object of this invention to increase the flexibility of timing and counting circuits employed in digital data systems.

These and other objects of this invention are achieved in one specific illustrative embodiment wherein both system timing and data storage are performed in a single shift register. In the case of a data receiver, the shift register and other elements of the system are recycled just preceding the initiation of a message and in the recycling operation the shift register is set to a discrete initial pattern. The discrete initial pattern may in the simplest instance be a "1" stored in the first stage of the shift register and "0's" stored in the remaining stages thereof, or any other discrete pattern which can be readily recognized. As data is serially shifted into the receiving shift register, the initial "1" stored in the first stage proceeds through the succeeding stages of the register. Circuit elements responsive to the setting of a shift register stage to the "1" state recognize the progress of the initial "1" through the register and, in accordance with the progress of the initial "1," provide timing or counting pulses to perform work operations or to provide an indication that an entire message has been received. Accordingly, both data storage and timing or counting functions are achieved in a common shift register.

In accordance with one feature of this invention, a shift register, having a sufficient number of stages to store a complete message, or a separable section thereof, is employed both as a data storage device and as a timing or counting device.

In accordance with another feature of this invention, a discrete initial pattern is entered in a shift register and the progress of this pattern observed to provide control signals to a communication system.

In accordance with another feature of this invention, establishment of the discrete initial pattern in the shift register, may comprise merely setting a particular stage to the "1" state and all remaining stages to their "0" states or may comprise the setting of a plurality of stages to their "1" states in order to provide a more secure initial pattern.

The above and other objects and features of this invention will be fully understood when read with reference to the single figure of the drawing which shows a data receiver advantageously employing the teachings of this invention.

The circuit shown in the drawing is arranged to accept a binary message comprising two ten-bit words. The message originates in the data source 2 and is in serial digital data form. The message is predetermined to have even parity in each of the words, that is, an even number of "1's" in each of the ten-bit words. Failure of parity in either word initiates an alarm signal and prevents transfer of data from the shift register 1 to the data utilization circuit 12.

In the drawing, there is shown a data source 2 which provides a recycle signal on conductor 41, a start signal on conductor 42, and data signals on conductor 43. The shift register 1 has input, output, advance, and recycle terminals. The data source data conductor 43 is connected to the shift register input terminal 25. The data signal recycle conductor 41 is connected to the recycle pulse source 4 which provides a recycle pulse on conductor 15 under control of a signal on conductor 41. The energization of recycle conductor 15 establishes the proper initial conditions in the shift register 1 and prepares the attendant circuitry for receipt of a data message. The advance pulse source is set in step by a signal from the data source on conductor 42. The bistable circuits 6 and 7 are respectively connected to the "1" output terminals of the eleventh and twenty-first stages of the shift register, and are set to their "1" states when their respective shift register stages have been set. The binary counter 5 is arranged to count the settings of the first stage of the shift register and is arranged to be set to its initial condition upon energization of the recycle pulse source 4. The alarm flip-flop 14 is arranged to be set to its "1" state upon the failure of parity in either of the received words, and the output AND gates represented by gates 30, 31, and 32 are energized whenever parity occurs in both words of the message and upon completion of the message. Energization of the output AND gates such as 30, 31, and 32 effects transfer of the information in the shift register 1 to the data utilization circuit 12. The data utilization circuit 12 may consist of circuitry for further processing the message data or may advantageously consist of additional storage or display arrangements.

Just preceding the transmission of data over conductor 43, recycle pulse source 4 is energized by a start signal from the data source 2 over conductor 41. Energization of the recycle pulse source 4 provides an output signal on conductor 15 which is effective to set the first stage of the shift register; reset all remaining stages of the shift register; reset the flip-flops 6 and 7, which are connected to the eleventh and twenty-first stages of the shift register; set the binary counter 5 to its "1" state and inhibit gate 18. Gate 18 is inhibited upon recycling of the shift register 1 and binary counter 5 so that the setting of the first stage of the shift register will not provide an input pulse to the binary counter in conflict with the setting pulse on conductor 15. Accordingly, the shift register 1 is cleared of all prior data and the initial pattern consisting of a "1" in the first stage and a "0" in each of the remaining stages is established. Immediately after or coincident with the recycling of the shift register and its attendant logic circuitry, the advance pulse source is set in phase by a signal from the data source 2 over conductor 42. Accordingly, the shift register advance pulses over conductors 26 and 27 are arranged to occur at the center of the pulses from the data source 2 over conductor 43. The serial digital message follows and is shifted into the shift register. Each time the first stage of the shift register is set to its "1" state as the message data is shifted into the shift register, a signal is applied through gate 18 and condenser 17 to operate binary counter 5. The initial "1" which is set in the first stage at the time the circuit was recycled precedes the message data in the shift register, and when the eleventh stage has been set indicating the transfer of the initial "1" to that stage, the flip-flop 6 is set to its "1" state. The output signals from the "1" conductors of the eleventh and twenty-first stages of the shift register 1 are transmitted to flip-flops 6 and 7, respectively, through delay pads 44 and 45. Each of the delay pads 44 and 45 introduces a delay of a fraction of a bit period. Accordingly, the "1" output conductors of flip-flops 6 and 7 will not be energized until shortly after setting of the binary counter 5 has been completed.

As the data was shifted into the register, the binary counter 5 was advanced one count each time a "1" was shifted into the first stage. Accordingly, if even parity, that is an even number of "1's," is present in the first ten bits of the serial message, the binary counter will have been set and reset an even plurality of times so that it is in its "1" state when the initial "1" reaches the eleventh stage.

The setting of the flip-flop 6 to its "1" state applies a signal through the condenser 9 and OR gate 8, to conductor 20. This signal is combined with the "0" output signal on conductor 19 from binary counter 5. If the binary counter is in its "0" state at the time the transient signal caused by the setting of flip-flop 6 to its "1" state occurs, failure of parity is indicated and the alarm flip-flop 14 is set to its "1" state through the enablement of AND gate 13 and the accompanying energization of conductor 21. With alarm flip-flop 14 set to its "1" state, alarm signal 51 will be operated by a signal over the "1" output conductor 52 from alarm flip-flop 14. After operation, alarm flip-flop 14 is reset by the manual operation of alarm reset switch 50 which applies a potential to the reset lead of alarm flip-flop 14. If parity is present in the ten bits, the binary counter 5 will be in its "1" state and the alarm AND gate 13 will not be enabled. As a result alarm flip-flop 14 will remain in its "0" state and alarm signal 51 will not be operated.

As the remainder of the message, that is, the next ten-bit word of the message, is shifted into the shift register 1, the initial "1" proceeds until it reaches the twenty-first stage. It should be noted that only the set terminal of the flip-flop is connected to the shift register output terminal. Therefore, subsequent transfer of "1's" and "0's" to the eleventh stage of the shift register will not affect the state of the flip-flop 6.

Transfer of the initial "1" to the twenty-first stage will set flip-flop 7 which is connected to the output terminal of the twenty-first stage. The signal derived from the setting of flip-flop 7 is transmitted through condenser 10, OR gate 8, and conductor 20 to the AND gate 13. If, as in the previously described instance, the binary counter is in its "1" state, indicating the presence of parity in the word just checked, the alarm AND gate 13 will not be enabled.

When the "1" output conductor 46 of the last stage of the shift register has been energized by the transfer of the initial "1" thereto, the advance pulse source 3 will be inhibited, thereby preventing further transfer of information through the shift register.

When the initial "1" is shifted into the twenty-first stage, indicating the receipt of a complete message, the information stored in the first twenty stages of the shift register will be transferred to the data utilization circuit 12 if parity is present. Transfer is accomplished through the output AND gates represented by 30, 31, and 32. The direct-current state of the output conductor of the flip-flop 7 is used as a first enabling signal to the output AND gates 30, 31, and 32. The "0" output conductor of the alarm flip-flop 14 is a second enabling lead to the AND gates 30, 31, and 32. If the alarm flip-flop is in its "0" state, indicating presence of parity, when the flip-flop 7 is set to its "1" state, indicating completion of a message, the output AND gates 30, 31, and 32 will be enabled to transfer the information stored in the first twenty stages of shift regitser 1 to data utilization circuit 12.

If parity has failed in either of the ten-bit words of the message, the alarm flip-flop will have been set to its "1" state, thereby inhibiting AND gates 30 through 32 and thereby preventing transfer of the message to utilization circuit 12 when the initial "1" is shifted into the twenty-first stage of shift register 1.

The parity checking circuitry described above and depicted in the drawing does not form a part of the present invention but instead comprises a part of the inventive combination disclosed and claimed in the above-identified Burdett et al. parent application. If the parity checking circuitry is not included in the arrangement shown in the drawing of this application, it is obvious that a message is transferred from the shift register 1 to the utilization circuit 12 in direct response to the appearance of the initial "1" bit in the twenty-first stage of the register.

The above arrangements comprise but one specific illustrative embodiment wherein the teachings of this invention are advantageously employed. It will be readily recognized that numerous other arrangements embodying the concepts of this invention may be devised by those skilled in the art without departing from the spirit and scope of the invention. For example, if it is desired, a more secure pattern consisting of other than an initial "1" may be employed. Further, the work operations timed through the progress of the initial "1" being shifted down the shift register are not limited to transfer of the information to the data utilization circuit, but rather may include any of the other numerous functions required of control and timing circuits in a data handling system. For example, a signal may be derived from a shift register in this manner to request an address recognition test, a code plausibility test, to recycle the system, or to initiate the performance of arithmetic of other logical operations with regard to data. Further, the teachings of this invention are not limited to the receiving arrangements shown herein, but rather may be advantageously employed in transmitting arrangements as well. For example, a discrete initial pattern may be inserted in a transmitting shift register along with message data that is to be transmitted serially. For example, a "1" may be inserted in the last stage of the register and another "1" inserted in a stage some number of stages away from the last stage. By way of example, a "1" may be inserted in the last stage and in the fifth from the last stage of the register. If it is established as a rule that only message data codes which have a "1" in at least every fourth bit are employed, it is possible to monitor the five stages closest to the transmitting end of the shift register and thereby determine when the last bit of the message has been transmitted. Accordingly, as the last bit of information is shifted out of the register, the transmitter may be shut down. In the case of a long message, this obviously saves a great deal of equipment since without the use of a discrete pattern accompanying the message data, it would be necessary to provide either a separate counting chain or to monitor all of the stages of the transmitting shift register.

What is claimed is:

1. In a communication switching system the combination comprising a plural stage shift register having input, output, and advance terminals, each of said stages having set, reset and output terminals, a serial message data source connected to said shift register input terminal, a recycle pulse source connected to certain of said set and reset terminals and controlled by said data source for establishing a discrete initial pattern of electrical states of said stages of said shift register, an advance pulse source controlled by said data source and connected to said shift register advance terminals, and bistable circuit means connected to certain of said shift register stage output terminals and responsive to the initial change of state of said certain stages subsequent to the occurrence of a pulse from said recycle pulse source for indicating the position of said serial message data in said shift register.

2. The combination of claim 1 wherein said recycle pulse source is connected to the set terminal of the first stage of said shift register and the reset terminals of the remaining stages of said shift register stages.

3. In a communication system the combination comprising a shift register having input, output, advance, and recycle terminals, a serial message data source connected to said input terminal, a recycle pulse source connected to said recycle terminals and controlled by signals from said data source for establishing a discrete initial pattern of electrical states of said stages of said shift register, said recycle pulse source effective to set the first stage of said shift registre to the "1" state and to reset all other stages of the shift register to the "0" state, an advance pulse source connected to said shift register advance terminals, said advance pulse source controlled by a signal from said data source, and switching means connected to certain of said output terminals for effecting transfer of said message data from said shift register.

4. A data storage system comprising, storage means having an information-bit storage capacity equivalent to a message of predetermined information-bit length, translating means for receiving and moving into storage in said storage means and in serial form therein data information presented in serial-bit form, and means for generating and inserting into storage in said means a full-storage indicia bit positioned in serial form with said data information but immediately preceding the first information bit thereof, whereby the appearance of said indicia bit at the output of said storage means indicates an information-bit count by said storage means equivalent to said predetermined information-bit storage capacity.

5. A data storage system comprising, storage means having an information-bit storage capacity equivalent to a message of predetermined information-bit length, translating means for receiving and stepping into storage in said storage means and in serial form therein data information presented in serial-bit form, and means for generating and stepping into storage in said storage means a full-storage indicia bit positioned in serial form with said data information but immediately preceding by one step the first information bit thereof, whereby the appearance of said indicia bit stepped from the output of said storage means indicates an information-bit count by said storage means equivalent to said predetermined information-bit storage capacity.

6. A data storage system comprising, data storage means, means for receiving and moving into said storage means in serial form therein data information presented in binary serial form, means for generating and moving into storage a control information bit in serial form with said data information and preceding the first information bit thereof, and means responsive to the appearance of said control bit at an output circuit of said storage means as the last data information bit is moved into storage for initiating an automatic movement of said data information out of said storage means.

7. A data storage system comprising, first storage means, means for receiving and moving into storage in said storage means and in serial form therein data information presented in binary serial form, means for generating and moving into storage in said storage means a control information bit in serial form with said data information but preceding the first information bit thereof, second storage means, and means responsive to the appearance of said control bit in an output circuit of said first storage means as the last data information bit is moved into said first storage means for initiating an automatic movement of said data information out of said first storage means and into said second storage means.

8. In combination, a plural stage shifting register having a plurality of information storage stages and also having at least one control stage separate and distinct from said information storage stages, said control stage normally having no signal therein, means applying successive input signals to a first stage of said register, means for shifting said register thereby to store said successive input signals in different ones of said plurality of information storage stages of said register respectively, a memory device, a normally inactive transfer network coupling said plurality of information storage stages of said register to the said memory device, and means comprising a signal control circuit coupled to said separate and distinct register control stage and responsive to shift of a signal into said register control stage during operation of said shifting means for activating said transfer network thereby to effect a transfer of signals from the plural information storage stages of said register to said memory device.

9. In combination, a plural stage shifting register having a sentinel signal in a first preselected stage thereof, means applying a serial train of information signals to an input of said register, means shifting said register subsequent to occurrence of each signal in said train thereby to effect a successive shift of said information signals and of said sentinel signal along the stages of said register whereby said shifting sentinel signal is always located in a stage of said register in advance of the register stages containing said information signals, means responsive to a shift of said sentinel signal into a second preselected stage of said register for effecting a simultaneous parallel readout of the information signals located in the stages of said register preceding said second preselected stage.

10. In combination, a plural stage shifting register having a sentinel signal normally stored in one stage thereof, means applying a train of information signals to an input of said register, means for shifting said register thereby to shift said sentinel signal out of said one stage and to effect a successive shift of said information signals and of said sentinel signal along the stages of said register whereby said information signals and said sentinel signal are distributed into different stages of said register during successive operation of said shifting means, means responsive to the shift of said sentinel signal into a preselected stage of said register for effecting a simultaneous read-out of the information signals in said register.

11. A data storage system comprising, a shifting register having a predetermined number of register stages electrically connected in tandem for storing individual ones of plural code bits representing a message of predetermined information-bit length, translating means for receiving and shifting through an input stage of said register and into storage in said register and in serial form therein binary coded data information of said predetermined length and presented to said translating means with all information bits succeeding one another in serial-bit form, and means for generating in timed relation to the reception of each message comprised by said data information of said predetermined length and for inserting into storage in said input stage of said register a full-storage indicia bit positioned in serial form with said data information but immediately preceding by at least one step the first information-bit thereof, whereby the appearance of said indicia bit in the output of the output stage of said register indicates an information-bit count by said register equivalent to a message of said predetermined information-bit length.

No references cited.

PAUL J. HENON, *Primary Examiner.*

P. WOODS, *Assistant Examiner.*